United States Patent [19]

Fischer et al.

[11] 4,442,313

[45] Apr. 10, 1984

[54] CONDUCTOR LOAD BEARING ROLLER FOR A GAS-INSULATED TRANSMISSION LINE HAVING A CORRUGATED OUTER CONDUCTOR

[75] Inventors: William H. Fischer; Kue H. Yoon, both of Pittsburgh, Pa.

[73] Assignee: The United States of America as represented by the United States Department of Energy, Washington, D.C.

[21] Appl. No.: 439,247

[22] Filed: Nov. 4, 1982

[51] Int. Cl.³ .......................... H01B 9/06; H01B 9/04; H02G 5/06
[52] U.S. Cl. ..................................... 174/28; 138/108; 174/14 R; 174/99 B
[58] Field of Search ...................... 174/14 R, 16 B, 27, 174/28, 99 R, 99 B, 99 E; 138/108, 112, 113, 114; 339/1 R, 6 R, 6 RL, 9 R, 9 E

[56] References Cited

U.S. PATENT DOCUMENTS 4,328,391 5/1982 Cookson .......................... 174/14 R Primary Examiner—Laramie E. Askin
Attorney, Agent, or Firm—M. S. Yatsko

[57] ABSTRACT

A gas-insulated transmission line includes a corrugated outer conductor, an inner conductor disposed within and insulated from the outer conductor by means of support insulators and an insulating gas, and a transport device for supporting and permitting movement of the inner conductor/insulating support assembly axially along the corrugated outer conductor without radial displacement. The transport device includes two movable contacts, such as skids or rollers, supported on a common pivot lever, the pivot lever being rotatably disposed about a pivot lever axis, which pivot lever axis is in turn disposed on the periphery of a support insulator or particle trap if one is used. The movable contacts are separated axially a distance equal to the axial distance between the peaks and valleys of the corrugations of the outer conductor and separated radially a distance equal to the radial distance between the peaks and valleys of the corrugations of the outer conductor. The transport device has the pivot lever axis disposed perpendicular to the direction of travel of the inner conductor/insulating support assembly.

3 Claims, 3 Drawing Figures

4,442,313

CONDUCTOR LOAD BEARING ROLLER FOR A GAS-INSULATED TRANSMISSION LINE HAVING A CORRUGATED OUTER CONDUCTOR

GOVERNMENT CONTRACT

The Government has rights in this invention pursuant to Contract No. ET-78-C01-2870 awarded by the United States Department of Energy.

CROSS-REFERENCE TO RELATED APPLICATIONS

This application is related to concurrently filed co-pending applications "Particle Trap to Sheath Contact For A Gas-Insulated Transmission Line Having A Corrugated Outer Conductor", Ser. No. 439,246, filed Nov. 4, 1982 by W. H. Fischer, K. H. Yoon and A. H. Cookson, "Particle Trap To Sheath Non-Binding Contact For A Gas-Insulated Transmission Line Having A Corrugated Outer Conductor", Ser. No. 439,245, filed Nov. 4, 1982 by W. H. Fischer, and "Non-Binding Conductor Load Bearing Roller For A Gas-Insulated Transmission Line Having A Corrugated Outer Conductor", Ser. No. 439,248, filed Nov. 4, 1982 by W. H. Fischer, all assigned to the same assignee as the present invention.

BACKGROUND OF THE INVENTION

1. Field of the Invention:

The invention relates in general to gas-insulated transmission lines and in particular to an inner conductor load bearing roller for a gas insulated transmission line having a corrugated outer conductor.

2. Description of the Prior Art:

Motion occurs between the inner conductor/insulating means assembly and the outer conductor of a gas insulated transmission line both when the transmission line is first assembled at the factory and while it is in service due to temperature differences between the outer and the inner conductors. The temperature changes may be due to changes in the continuous current and in the ambient temperature the gas-insulated transmission line is operating in.

Previous gas-insulated transmission lines utilized a skid contact member located at the end of the insulator and motion occurred between the skid and the tubular outer sheath. The motion between the skid and the outer sheath may produce particles which reduce the voltage withstand ability of the gas-insulated transmission line. In order to eliminate the production of particles, a roller assembly was installed in place of the skids.

A recent development for gas-insulated transmission lines uses corrugated aluminum for the outer conductor or sheath instead of the smooth elongated aluminum type used previously. The roller or skid design of previous gas-insulated transmission lines, when applied to a corrugated outer conductor or sheath, will have the disadvantages that the inner conductor/insulating means assembly will be forced to rise and fall with the corrugations and the force to obtain this axial motion upon assembly or during service will be high.

Accordingly, it would be desirable to have a transport means for the inner conductor/insulating means assembly which retains the advantages of not producing particles and the low force of the previous roller design but is applicable to a corrugated sheath outer conductor without having the disadvantage of radial movement of the inner conductor/insulating means assembly during axial movement of the inner conductor relative to the outer corrugated sheath.

SUMMARY OF THE INVENTION

Briefly, the present invention is a transmission line including a corrugated outer conductor, an inner conductor adapted for connection to an external energizing source and disposed interiorly within the corrugated outer conductor, means for insulatingly supporting the inner conductor within the outer conductor, and transport means for supporting and permitting movement of the inner conductor/insulating means assembly axially along the corrugated outer conductor without radial displacement. The transport means includes two movable support means, such as skids or rollers, supported on a common pivot lever, the pivot lever being rotatable about a pivot lever axis. The support means are separated axially a distance equal to the axial distance between the peaks and valleys of the corrugations of the outer conductor and separated radially a distance equal to the radial distance between the peaks and valleys of the corrugations of the outer conductor. The movable support means are disposed on opposite ends of a pivot lever bend and the pivot lever axis is equidistant from the ends of the pivot lever. The pivot lever axis is mounted on either the outer extremity of the insulator or on the outer periphery of the particle trap if one is used. The transport means has the pivot lever axis disposed perpendicular to the direction of travel of the inner conductor/insulating means assembly. The transport means according to the teachings of the invention provides the advantages that the inner conductor/insulator assembly is permitted axial movement without radial displacement within the outer corrugated conductor for ease of assembly and trouble free movement within the transmission line during service.

BRIEF DESCRIPTION OF THE DRAWINGS

The invention may be understood and further advantages and uses thereof more readily appreciated when considered in view of the following detailed description of the exemplary embodiments, taken with the accompanying drawings, in which.

DETAILED DESCRIPTION

Figure 1:
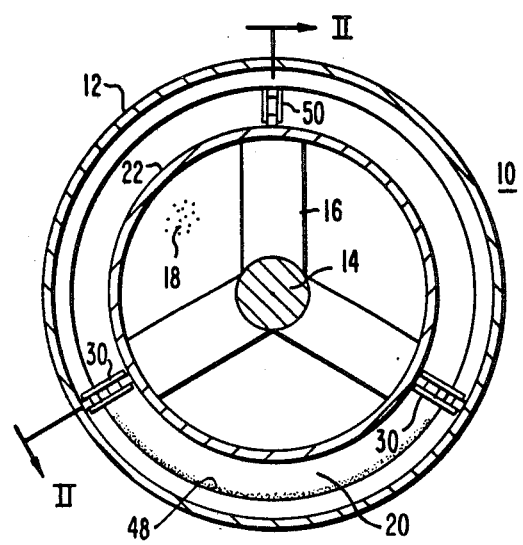
FIG. 1 is a cross-sectional view of a gas-insulated transmission line constructed according to the teachings of the invention.
Figure 2:
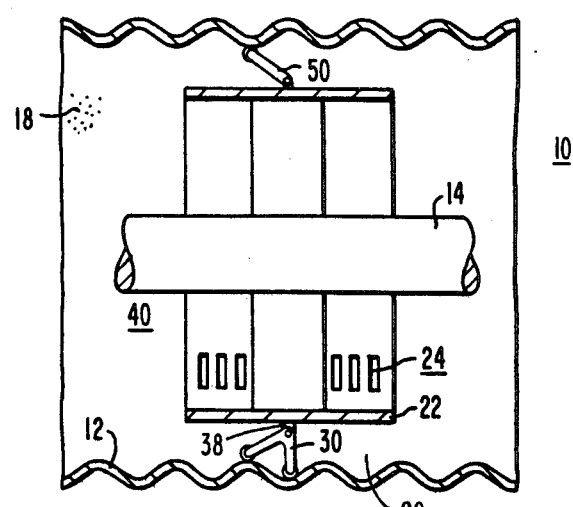
FIG. 2 is a longitudinal cross-sectional view taken along the lines II—II of FIG. 1.

Referring now to the drawings and to FIGS. 1 and 2 in particular, there are shown vertical and longitudinal cross-sectional views, respectively, of a gas-insulated transmission line constructed according to the teachings of the invention. Gas-insulated transmission line 10 includes an elongated, corrugated cylindrical outer sheath or outer conductor 12, and an elongated inner conductor 14 disposed within and spaced apart from, the corrugated outer conductor 12. The outer sheath or outer conductor 12 will typically be at low or ground electrical potential, whereas the inner conductor 14 will be at high electrical potential with respect to the outer sheath 12, and may typically carry voltages in the range 138–1200 KV. Insulatably supporting the inner conductor 14 within the outer sheath or outer conductor 12 are a plurality of supporting insulators 16, and electrically insulating the inner conductor 14 from the outer conductor 12 is an insulating gas 18, tupical of which is sulphur hexafluoride, at pressures of approximately 50 pounds per square inch gage. Support insulator 16 is illustrated as a tripost design, although the invention may be utilized with alternate support insulators such as for example, disc or conically shaped, as will be more fully appreciated later. Providing low field regions 20 adjacent to the insulating spacers 16 are particle trapping rings 22 having apertures 24 to facilitate entry of particles into the low field regions 20. The inner conductor 14, the outer conductor or outer sheath 12, and the particle-trapping rings 22 will typically be of good electrically conducting material such as aluminum.

During assembly of the transmission line, as well as during expansion or contraction of the inner and outer conductors, it is important to minimize particle generation within the transmission line. Movement of the inner conductor/insulator/particle trapping means assembly within a corrugated outer conductor poses significant problems, which the transport means 30 of the present invention overcomes. Transport means 30 supports and permits axial movement without radial displacement of the inner conductor/insulator/particle trap assembly 40 along corrugated outer conductor 12. Referring again now to FIG. 1, transport means 30 would be disposed near the bottom of gas-insulated transmission line 10 along the periphery of support insulator 16 or particle trap 22, and for stability, it would be beneficial to dispose two transport means 30 separated radially a predetermined amount. Since FIG. 1 illustrates a tripost insulator, it would be consistent to dispose the transport means 30 proximate the lower ends of the tripost insulator thereby separating them by 120°, although this is not necessary to utilize the invention. Since transport means 30 is disposed on particle trap 22 by means of support arm 38, it can be recognized that transport means 30 may be located and/or separated anywhere along the bottom periphery of particle trap 22 that promotes stability or it may be mounted directly on the outer periphery of an insulator if a particle trap is not used or not located at the desired position. If an adhesive such as, for example, PLIOBOND, or the polyvinyl copolymers or thermosetting epoxy resin materials described in U.S. Pat. No. 3,911,937 or U.S. Pat. No. 4,327,243, is to be used at the base of outer corrugated conductor 12, it will be located to the center of the two transport means 30 as shown generally in FIG. 1 at 48. Referring again now to FIG. 1, there is shown generally at 50 at the top of particle trap 22 a contact means for keeping an electrical continuity between the corrugated outer conductor 12 and the particle trap 22 regardless of the position of the particle trap relative to the corrugations of the corrugated outer conductor 12 as more fully described in concurrently filed copending applications "Particle Trap To Sheath Contact For A Gas-Insulated Transmission Line Having A Corrugated Outer Conductor", Ser. No. 439,246, by W. H. Fischer, K. H. Yoon and A. H. Cookson and "Particle Trap To Sheath Non-Binding Contact For A Gas-Insulated Transmission Line Having A Corrugated Outer Conductor", Ser. No. 439,245, by W. H. Fischer, both assigned to the same assignee as the present invention.

Figure 3:
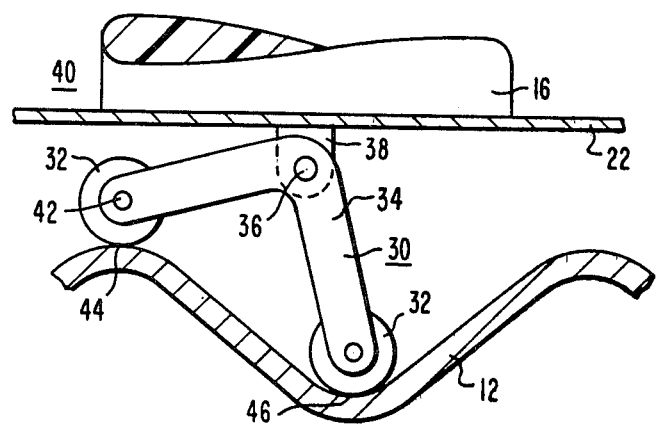
FIG. 3 is an enlarged view of a portion of the insulator particle trap, corrugated outer conductor, and transport means of FIGS. 1 and 2 for supporting and permitting movement of the inner conductor/insulating means assembly axially along the corrugated outer conductor without radial displacement according to the teachings of the invention.

Referring now to FIG. 3 transport means 30 includes two movable support means 32, which may be for example skids or preferably nonmetallic rollers so as to prevent the generation of conducting particles, disposed on the ends of pivot lever 34, which pivot lever 34 is rotatably mounted at the midpoint on pivot pin 36 which pivot pin 36 in turn is disposed on support arm 38. Rollers 32 are rotatably disposed on pivot lever 34 by means of roller bearings 42 and pivot lever 34 is designed such that rollers 32 are separated axially a predetermined distance equal to the distance between the peaks and valleys 44, 46 respectively of outer conductor 12. Rollers 32 are separated radially a second predetermined distance equal to the radial distance between the peaks and valleys 44, 46 respectively, of outer conductor 12. Since pivot lever 34 rotates at its midpoint around pivot pin 36, inner conductor/insulator/particle trap assembly 40 is longitudinally transported within corrugated outer conductor 12 without radial displacement.

The transport means 30 illustrated in FIGS. 1, 2 and 3 is economical to produce and functions well on corrugated outer conductors having corrugations with gradual slopes.

In conclusion, there has been disclosed a unique, simple, low cost transport means that can be used with the corrugated sheath or corrugated outer conductor. The invention is of an economical design that would work well with corrugated outer conductors having mild slopes to the corrugations.

The inner conductor/particle trap/insulator assembly may be moved axially within an outer corrugated conductor without radial displacement and with minimum particle generation due to the transport means of the invention.

We claim:

1. A gas-insulated transmission line, comprising:
   (A) a corrugated outer conductor;
   (B) an inner conductor adapted for connection to an energizing source and disposed interiorly within said outer conductor;
   (C) an insulating gas disposed within the annular space between said outer and inner conductors;
   (D) insulating means disposed between said outer and inner conductors for insulatingly supporting said inner conductor within said outer conductor; and
   (E) transport means for supporting and permitting axial movement without radial displacement of said inner conductor/insulating means assembly along said corrugated outer conductor, said transport means including two movable support means supported on a common pivot lever, said pivot lever being rotatable about a pivot lever axis, said two movable support means being separated axially a distance equal to the axial distance between the peaks and valleys of the corrugations and separated radially a predetermined distance equal to the radial distance between the peaks and valleys of the corrugations.

2. The gas-insulated transmission line of claim 1 wherein the movable support means are nonmetallic rollers and said rollers are rotatably disposed on the ends of said pivot lever, said pivot lever axis being located equidistant from the ends of said pivot lever.

3. The gas-insulated transmission line of claim 1 wherein the pivot lever axis is disposed perpendicular to the direction of travel of the inner conductor/insulating means assembly.

* * * * *